United States Patent [19]

Hwang

[11] Patent Number: 5,475,601
[45] Date of Patent: Dec. 12, 1995

[54] CONTROL FOR GLASSWARE FORMING SYSTEM INCLUDING BIDIRECTIONAL NETWORK GATEWAY

[75] Inventor: David K. Hwang, Storrs, Conn.

[73] Assignee: Emhart Glass Machinery Investments Inc., Wilmington, Del.

[21] Appl. No.: 196,307

[22] Filed: Feb. 15, 1994

[51] Int. Cl.⁶ .............................. G06F 15/80; G06F 9/00
[52] U.S. Cl. .................. 364/473; 364/155; 364/474.11; 379/219; 395/600
[58] Field of Search ................... 364/DIG. 1, DIG. 2, 364/155, 473, 474.11; 395/600; 379/219

[56] References Cited

U.S. PATENT DOCUMENTS

| | | | |
|---|---|---|---|
| 4,457,772 | 7/1984 | Haynes et al. ............................ | 65/160 |
| 4,641,269 | 2/1987 | JaPenga et al. .......................... | 364/473 |
| 5,097,528 | 3/1992 | Gursahaney et al. ..................... | 379/67 |
| 5,247,450 | 9/1993 | Clark ........................................ | 364/473 |
| 5,345,389 | 9/1994 | Calvin et al. ............................. | 364/473 |
| 5,349,678 | 9/1994 | Morris et al. ............................ | 395/800 |

Primary Examiner—Thomas G. Black
Assistant Examiner—Jean R. Homere
Attorney, Agent, or Firm—Spencer T. Smith

[57] ABSTRACT

Bidirectional communication between one or more workstations which may be operating on one platform such as UNIX, VAX/VMS or NOVELL's NetWare with an event driven database which is operating on a different platform such as QNX is made possible by separating a gateway into two portions with one portion in each platform bidirectionally linked with a pair of BSD socket libraries on each platform.

1 Claim, 11 Drawing Sheets

FIG 1

Fig_2

Fig_3

Fig_4

Fig_5

Fig_6

Fig_7

Fig_8

Fig_9

Fig_10

Fig_11

CONTROL FOR GLASSWARE FORMING SYSTEM INCLUDING BIDIRECTIONAL NETWORK GATEWAY

BACKGROUND OF THE INVENTION

A glassware factory has a number of computer controlled machines, which together, define the glassware forming process. These machines may include, for example, an I. S. machine, such as disclosed in U.S. Pat. No. 4,641,269, which includes a plurality of sections, each controlled by an independent controller. Archive data for these controllers is centralized at a control room console. Formed bottles are inspected by inspection equipment which may comprise one or more discrete machines each having its own independent controller.

Such I. S. machines and inspection equipment sold by the assignee of this application operate on the non-standard QNX platform (a multi-tasking, multi-user, real-time operating system for microcomputer systems marketed by Quantum software systems, Ltd). Such a non-standard platform can not be accessed by outside Computers operating on standard platforms such as UNIX, VAX/VMS and Novell's Netware in the standard ETHERNET (TCP/IP) network environment, and accordingly, such user workstations in the glassware factory can not access the databases of these I. S. machines or the inspection equipment.

SUMMARY OF THE INVENTION

It is accordingly an object of the present invention to provide a network gateway that will provide access from remote user workstations to the databases of these glassware forming and inspection machines. This is i achieved with a distributed computing environment that hides the geographic location of the databases distributed in a network environment and makes them appear to be local when accessed from the users' workstations. The gateway provides support for two way data communication between the machinery database and remote workstations. Not only can the remote user ask for and receive data through the gateway, but also if the database has any unsolicited changes, the gateway will be able to immediately pass them through to the remote user.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings.

DESCRIPTION OF THE PREFERRED EMBODIMENTS

DESCRIPTION OF THE PREFERRED EMBODIMENTS

Figure 1:
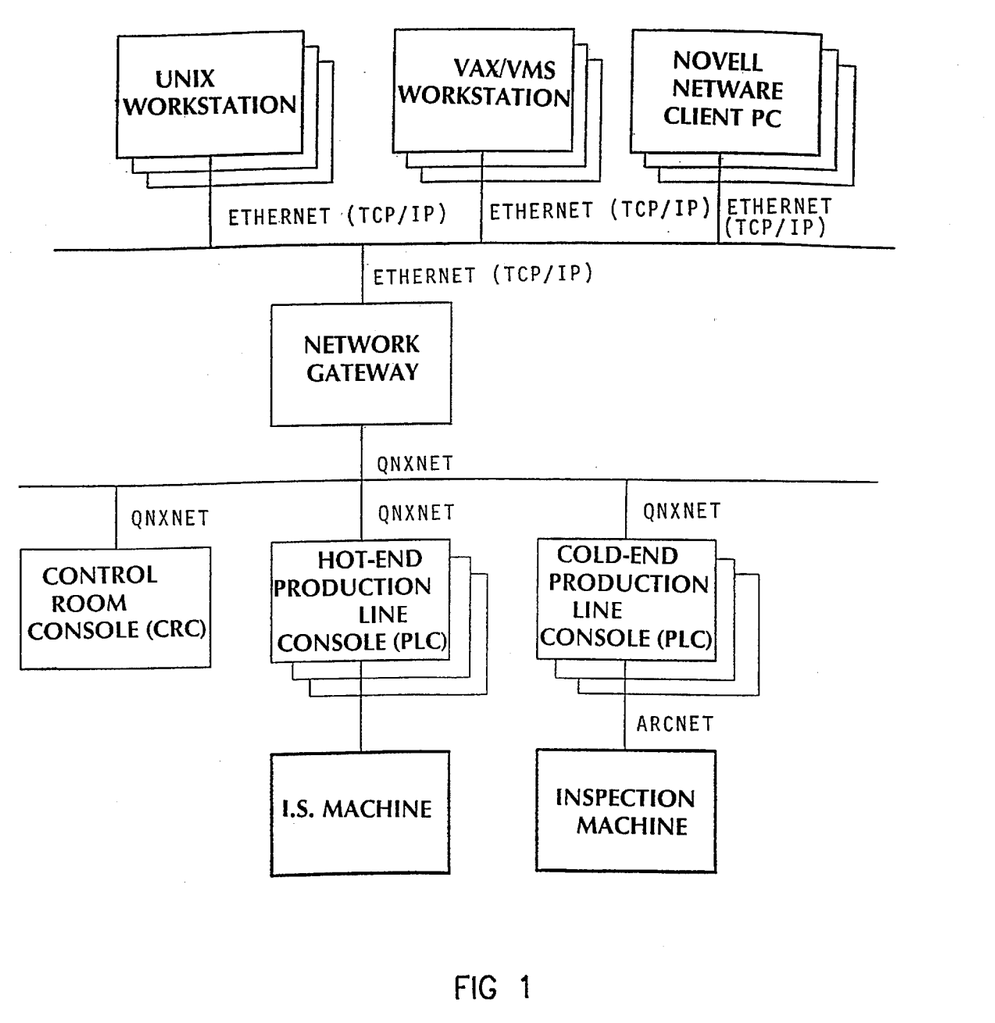
FIG. 1 is a block diagram illustrating the system architecture depicting the relationship between the network gateway made in accordance with the teachings of the present invention, the local computers and the external application environment.

Referring to FIG. 1, a glassware forming I. S. machine has a number of Production Line Consoles—Each console contains an event driven database EDDB that supports all this supervisory control information for that I. S. machine. Archive Data for all of these event driven databases of multiple machines is centralized at a Control Room Console hard drive (disk) database. Also available on the QNX network are the cold-end production consoles running Inspection Connection Software that accesses the Inspection Equipment database via ARCnet. It is the goal of this invention to allow user application access to these QNX-based databases from workstations running either UNIX, VAX/VMS or Novell's Netware in the standard Ethernet TCP/IP network environment through the Network Gateway.

The Network Gateway is an IBM PC compatible computer that consists of the following hardware and software components: 486/33 MHz IBM-PC with 8 MB memory (no hard drive); QNX operating system V2.15 F or later; QNXnet board; Fastech's TCP/IP Connectivity for QNX Device Driver, including the Berkeley Socket Library and the CMC-640 Ethernet interface card; and Gateway Server Software for accessing the databases.

This allows the workstation, by way of Ethernet, to collect the required database information on the QNX network. The gateway traffic is two-way, however, meaning that the Network Gateway can also initiate the data transfer to reach the workstations. In implementation, the initiated events are limited to only the database item changes defined and requested by the workstation.

The Network Gateway Software supports multiple user "ports" which can reside in multiple processes within a single user workstation or in a single or multiple process among multiple users' workstations. The Network Gateway Software itself can also reside in a single CPU or multiple PC's, each with a different name.

The cold-end production line console (PLC), is another IBM-PC compatible computer interfacing with both the ARCnet and QNX network. The ARCnet interface collects data from all of the Inspection Equipment while QNXnet makes the cold-end PLC a node on the QNX network. The Inspection Connection software is running Under QNX on the cold-end PLC.

An alternative way of architecting the system is to combine the cold-end PLC and the Network Gateway hardware into one PC box by simply plugging the ARCNet card into the Gateway PC and running the Inspection Connection and Gateway service software in the same PC. To a limit, this approach offers advantages both in reduced cost and increased performance. When more than one cold-end inspection machine is added to the system, however, the regular configuration of having a separate PC running the Inspection Connection will give user flexibility of adding additional PC's to meet the increased demands.

The Gateway software is partitioned into client (workstation) and server (Gateway) parts. The client software will include a set of API library files in "C" source code format so that the user can compile and link it with his application code and Transmission Control Protocol/Internet Protocol) socket library. Running on the Gateway under QNX is the server software that services the data acquisition requests (from the user to the databases) as well as database change events (from the database to user application). The server software supports multiple client connections as well as multiple sessions.

Figure 2:
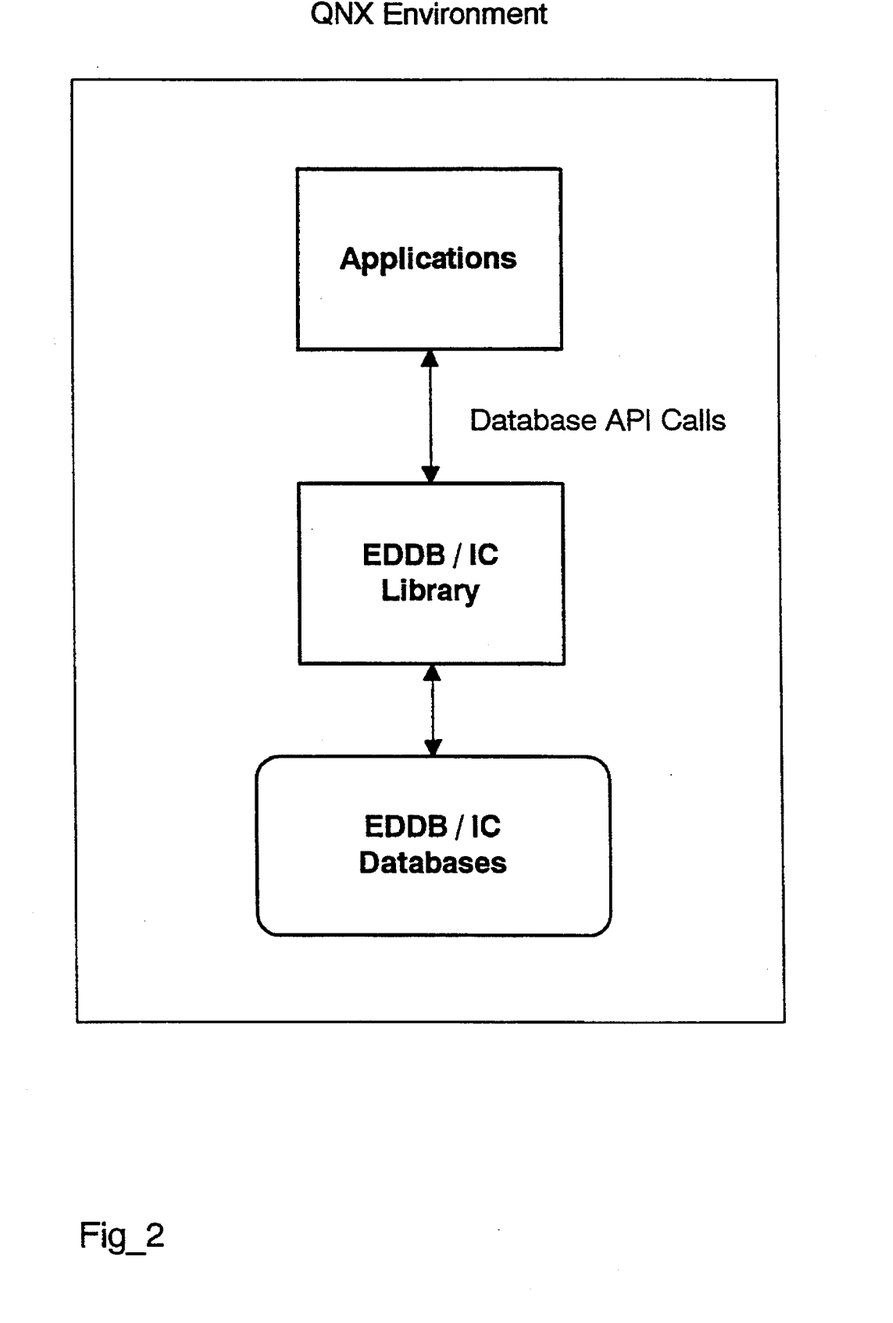
FIG. 2 is a block diagram illustrating an event driven database API design in QNX Environment.

For QNX application developers, the assignee of the present application has published the Event Driven Database (EDDB) Tool kit that contains standard (native) EDDB Library API's for EDDB database access in a QNX environment (FIG. 2). In the QNX environment, the application task can issue EDDB APL (Application Programming Interface) calls from the local EDDB Library to open (locate) a local or remote EDDB database and access data from it thereafter. In this network intrinsic environment, the user does not need to know the location of the database. The geographical locations of the EDDB databases are resolved transparently by the QNX networking facility.

Figure 3:
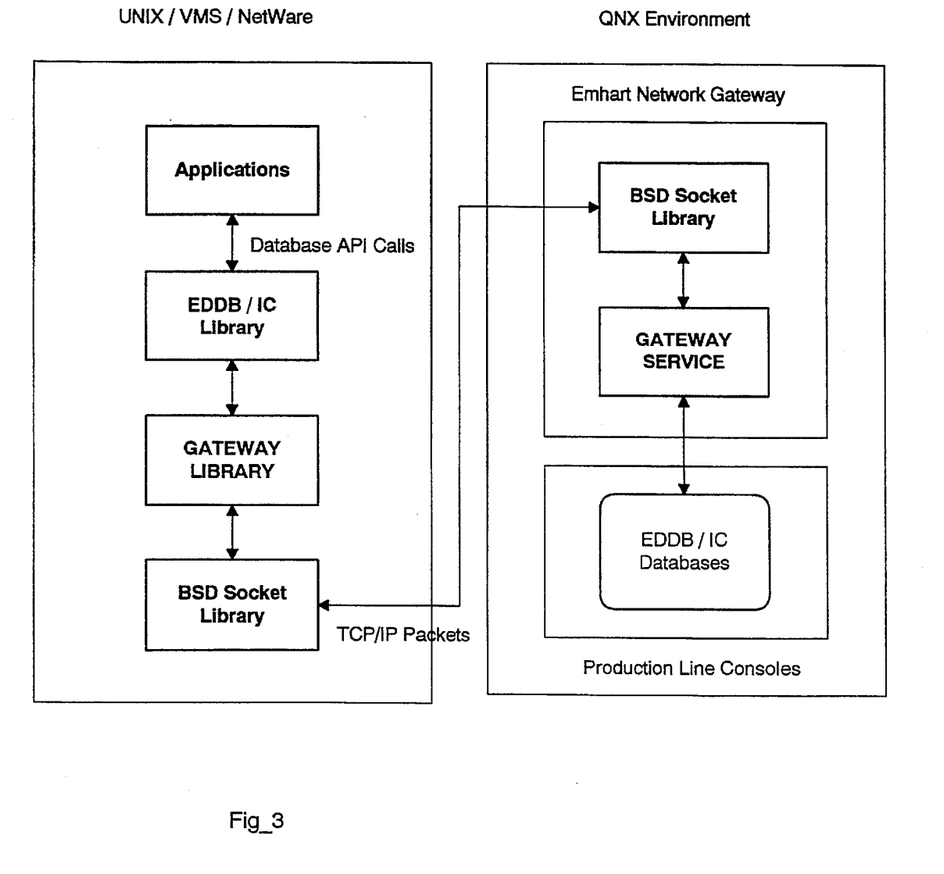
FIG. 3 is a block diagram illustrating the distributed software design of the network gateway.

The Gateway design extends the EDDB/IC (Inspection Connection) Library API's across the network to enable developers to write user application programs on UNIX, VAX/VMS/Novell workstations using the same EDDB/IC programming interface. In order to achieve this goal, the EDDB/IC Library on the user's node must be enhanced by adding a layer of software below it to support packet transfer between the user and the Gateway. A corresponding set of software must also exist on the Gateway node to service the request. FIG. 3 depicts the distributed software design of this approach: Part of the software—Gateway Library—is distributed upon user's platform while the other part—Gateway Service—resides on the Gateway, both of them use the Berkeley Sockets Library (BSD Berkeley Software Distribution 4.3) to perform low-level TCP socket setup, session connection and packet transfer tasks.

By making EDDB/IC calls, the UNIX/VMS/Novell application program can now access the remote databases as if they were available locally. The user applications make EDDB/IC API calls, but the Gateway Library converts the "name locate," "send" and "vc release" system calls that are unique for the QNX environment to TCP/IP command packets and sends the packets to Gateway. The Gateway Service running under QNX will then provide the real "name locate," "send" and "vc release" calls to access EDDB databases information and send the data and status back to user application program over the same pair of network sockets. All of the packet transfer mechanism is transparent to the developer, thus it is as if the data were available to him locally on his machine. The Gateway Library is written in ANSI "C" and requires minimum porting work to make it available to the developer's target system. No change will be necessary in the Gateway Service, which is available only in the executable form and will run forever in the Gateway memory as long as Gateway PC is running. From the software point of view, the Gateway is a nonstandard TCP/IP protocol application in a distributed environment.

In the Gateway design, the user is the third party application who initiates the request for communication and waits for a response from server. The user "lives" in a user machine. By comparison, a server resides in the Gateway (forever) and waits for incoming communication requests from a user. When it receives a user request, the server performs the necessary database access and returns the result to the client. In essence, the server "lives" in the Gateway and acts like a universal database engine.

The Gateway provides dynamic event driven data updates from a database to the user as long as the data items are being attached by the user application. The user program is, accordingly, notified by the server (which was first notified by the EDDB/IC database) only when there was a real change in the selected database item. This additional requirement calls for a pair of dedicated sockets on the Gateway and user's node to communicate with each other (connecting from Gateway to user). The TCP transport protocol is used.

The Gateway provides services that will connect multiple user nodes to the EDDB databases. Each connection has its own unique socket established with the user throughout the session. A session is defined as user making connection with the Gateway to request information. When a session is over, the socket is released to the system for use in the future. The number of sockets available is only limited by what the TCP/QNX device driver can provide.

Figure 4:
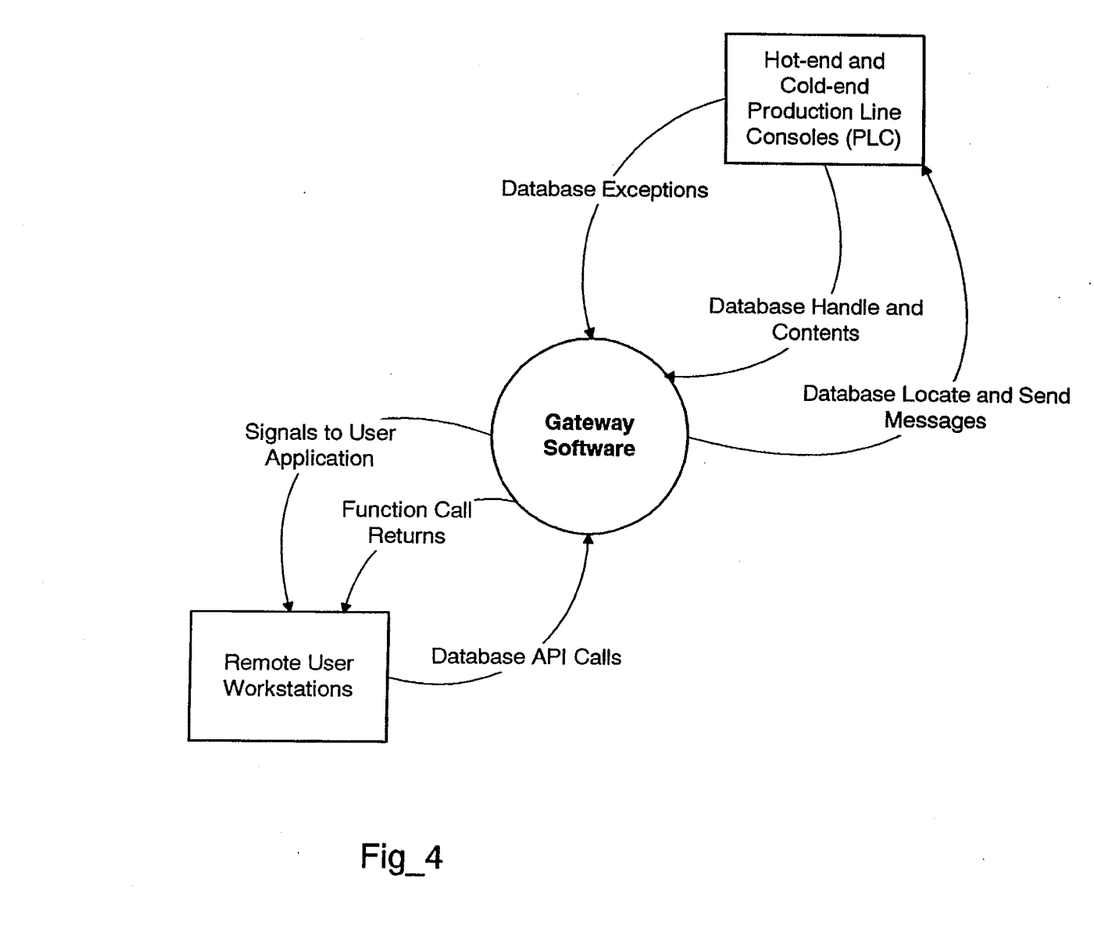
FIG. 4 is a top level context data flow diagram depicting the network gateway software as a whole, supporting the connection between production line consoles and the hosts.

The top-level context diagram shown in FIG. 4 depicts the Gateway Software as a whole, supporting the connection between Production Line Consoles (PLC's) and user's UNIX/VMX/Novell workstations. The user application makes the EDDB/IC API calls to locate and read the EDDB/IC database. The function calls return with database handle and item contents for user's applications. The Gateway also supports EDDB/IC exceptions that came in from PLC's or Inspection Connection as signals to user's task for asynchronous event update. For example, these external events could be Event Angle change or Inspection results packets. Thus, there are two main data flows in the Gateway design: (1) the data acquisition from UNIX/VMS/Novell workstations to PLC's and (2) the secondary event updates from PLC's back to the UNIX/VMS/Novell workstations. The Gateway handles all the detail session connection and data packet transfers between two different operating systems (UNIX/VMS/Novell and QNX) and networking environments (TCP/IP on Ethernet and QNXnet on ARCnet).

Figure 5:
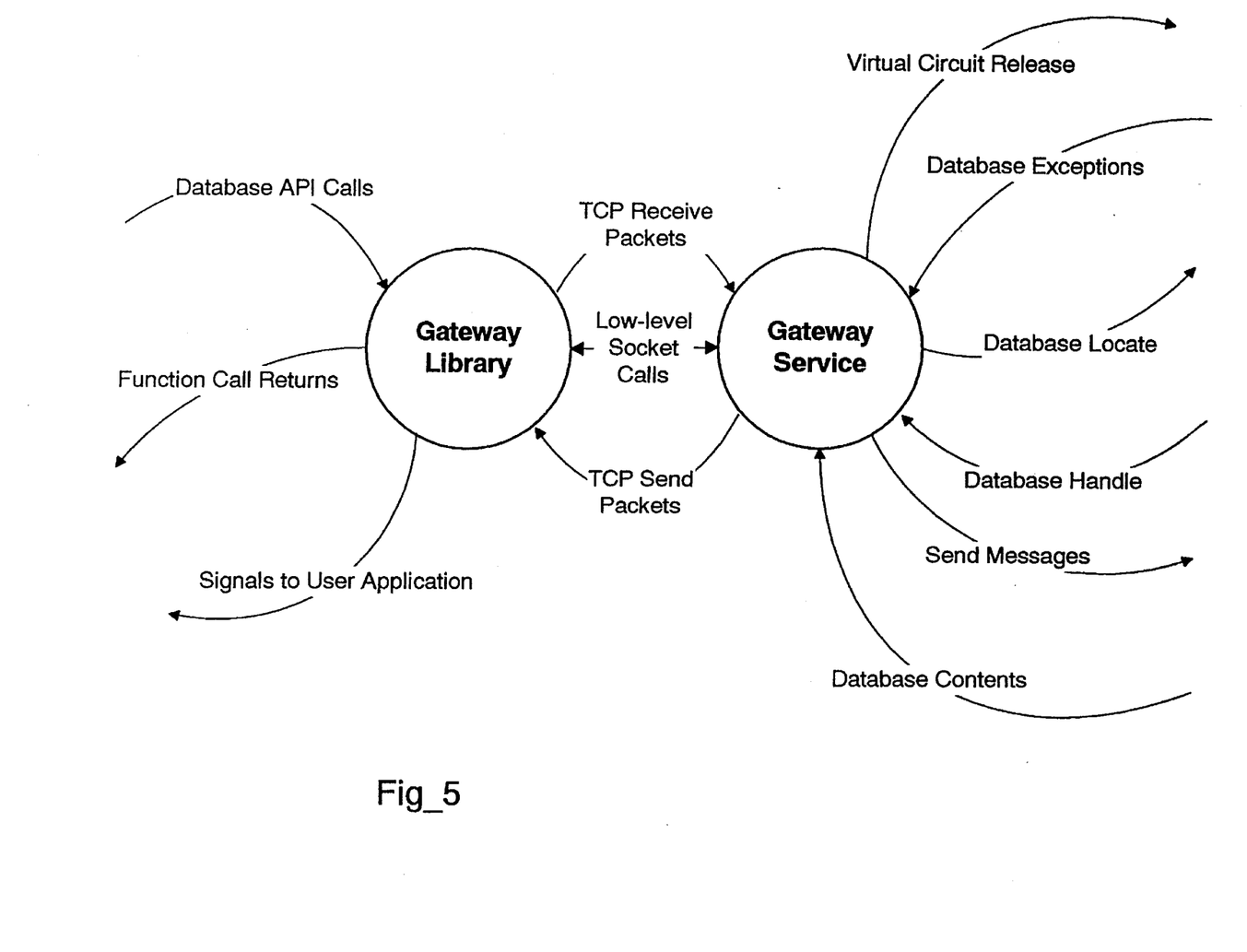
FIG. 5 is a next level data flow diagram for the network gateway.

The Gateway design is implemented in two parts as depicted in FIG. 5. The Gateway Library (user application library) is the part that "lives" on client's node. It interfaces with user's applications and converses with Gateway Service (Server Application Software) in the Gateway via TCP packets on the Ethernet network. The Gateway Service consists of a set of user application tasks to locate and access an EDDB database in the QNX environment. The Server Application gives the results back to the Client Application via TCP packets. The results could be due to either database inquiry or EDDB exception.

Figure 6:
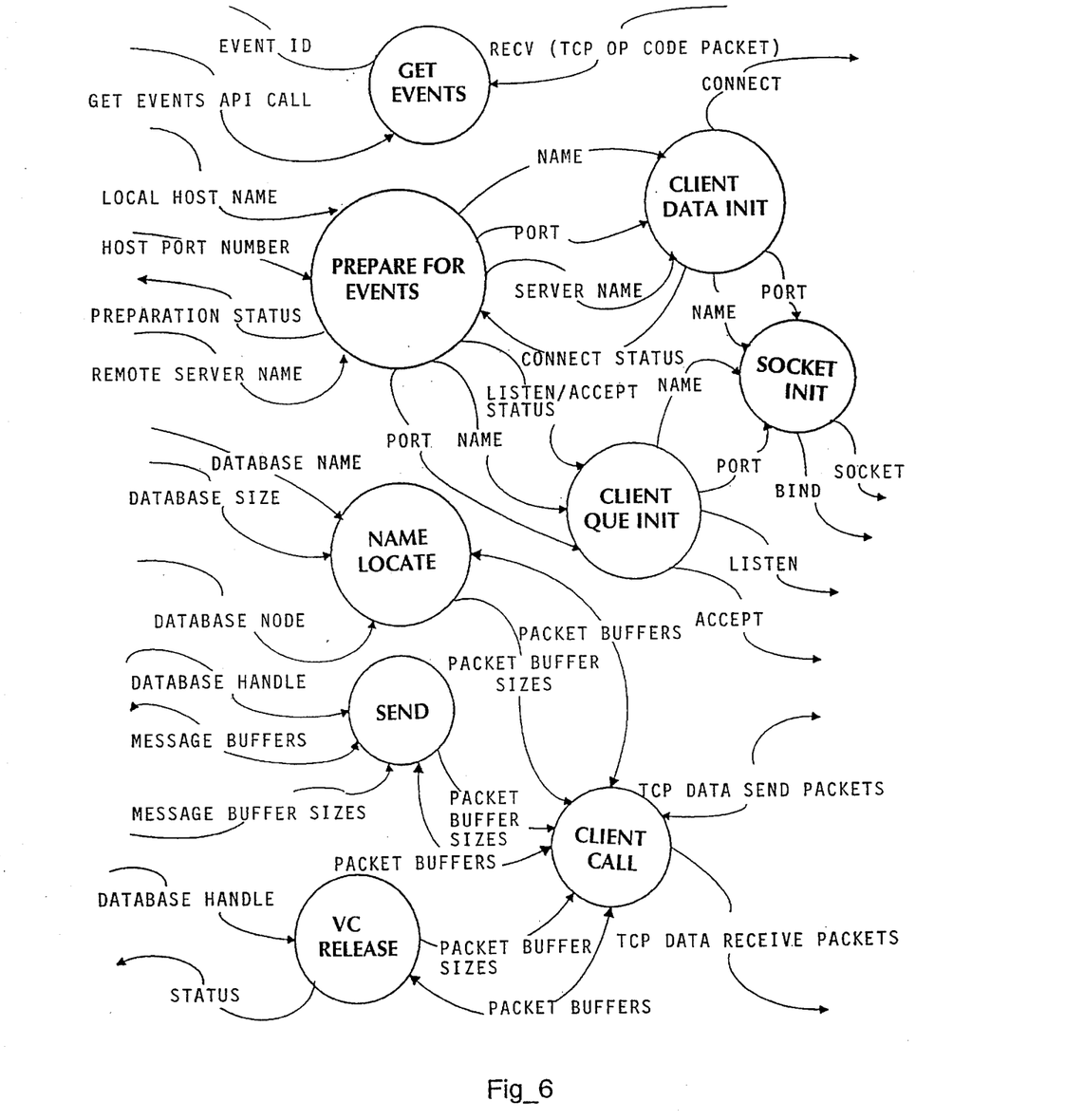
FIG. 6 is a data flow diagram depicting the flow of data among the various modules of the Gateway Library shown in FIG. 5.

The Gateway Library is the layer of software for the user application programmer to link with in order to access the database. FIG. 6 depicts the data flow among the various modules of the Gateway Library as used by the application.

The functions for user interface are contained in the following modules: Name Locate, Send, and PrepareFor- Events. The Client Call Module handles TCP packet transfer by making "send" and "recv" calls in the Berkeley Sockets Library. The PrepareForEvents function initializes the socket for data transfer on user's node and sets up the user event signal handling mechanism by establishing a separate event queing socket. After the client has made connection with the Gateway Service, the Gateway Service, besides fulfilling other responsibilities, will attempt to set up its own event queing socket and make a connection to the client's event queing socket. If this connection is established, any attached database item changes in EDDB/IC will be sent back to the user via event queing socket. The message is packaged locally and sent from the client to the Gateway Server where the packets are unpacked and decoded before doing the QNX "send" message passing. The received packets will then be sent back to the client application task buffer space in the EDDB/CI Library, and ultimately transferred to client's application.

Figure 7:
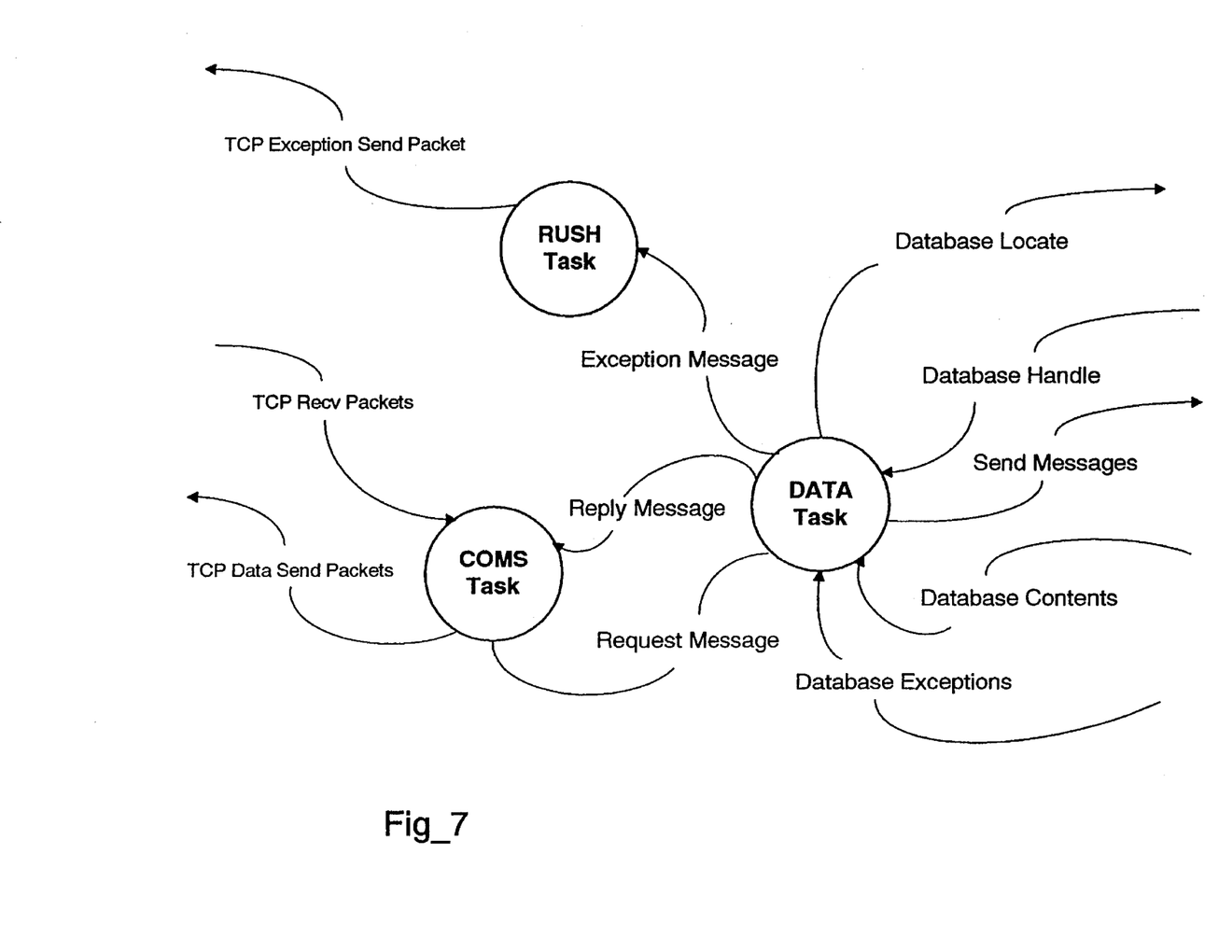
FIG. 7 is a data flow diagram depicting the intertask communication and data interfaces between the Gateway Service shown in FIG. 5 and its resources.

FIG. 7 depicts intertask communication within the Gateway Service as well as data interfaces between the Gateway Service and its outside resources. The Gateway Server functions as a universal, session-oriented database server, and its design consists of the following coordinating tasks:
• The Main Program of the "server" task starts execution when it is fired up and will run forever. It obtains a protocol port, registers the program with the port mapper, and then waits (listens) to receive a user request that comes in as TCP/IP message packets from the data socket. Due to the fact that multiple clients can access up to sixteen (16) PLC's at one time, the main program must await more incoming connections while data on the channel gets processed concurrently by the child processes. The set of child processes spawned off include "coms" and "data". One for each session connection. These tasks communicate with each other via QNX local name registrations. • The Communication Task, "coms" first attaches itself with the local QNX clearinghouse name. It then stays in the do forever loop to receive any incoming data packets in blocking mode. After receiving a packet, "coms" first checks the operation code to see whether it is the port number packet. The port number packet is sent by the client at the beginning of the session establishment process in order to inform the Gateway Service which port to send to for the database exception events. The port number packet will cause "coms" to spawn off the "rush" task to connect to the client on the event queing socket. Other op-codes supported are: name locate, send or vc release. The difference among these QNX operations is the reply packet size. The task "coms" then sends the packet to the task "data" via QNX message transfer. Since the QNX send call also receives a message back, as soon as the send call returns, the program will send the reply TCP packet back to the client over the TCP/IP network. • The Database Link Task, "data," starts by attaching itself with the clearinghouse locally under the name. It then stays in the receive block loop forever until: • The "coms" task sends it a message after receiving data packet from the client application, or • The EDDB/IC exception signaling the database attached items had changed.

If the task wakes up because "coms" sent over a message, it first decodes the operation code (name locate, send or vc release) and performs the QNX operation accordingly. The task will then reply to the sender task "coms" with the results.

If the task receives an EDDB/IC database exception signal, it will send a QNX message immediately to the task "rush" to notify the event source. • The Event Notification Task, "rush," is spawned off by the "coms" task and first attaches itself locally with the clearinghouse. It then sets up the exception event queing socket at the server for event notification. In the Event Notification, the Gateway server actually acts like a client, so the socket it created will have to call connect () to make the connection with the event queing socket on the client mode. The task then falls into the do-forever-loop to receive from the task "data" for any exception events. Upon receiving the exceptions, it proceeds to do two things right away:

1. Send reply message back to task "data" just for the purpose of unblocking it.
2. Sends event notification packet via the event queuing socket to the client node for processing.

Figure 8:
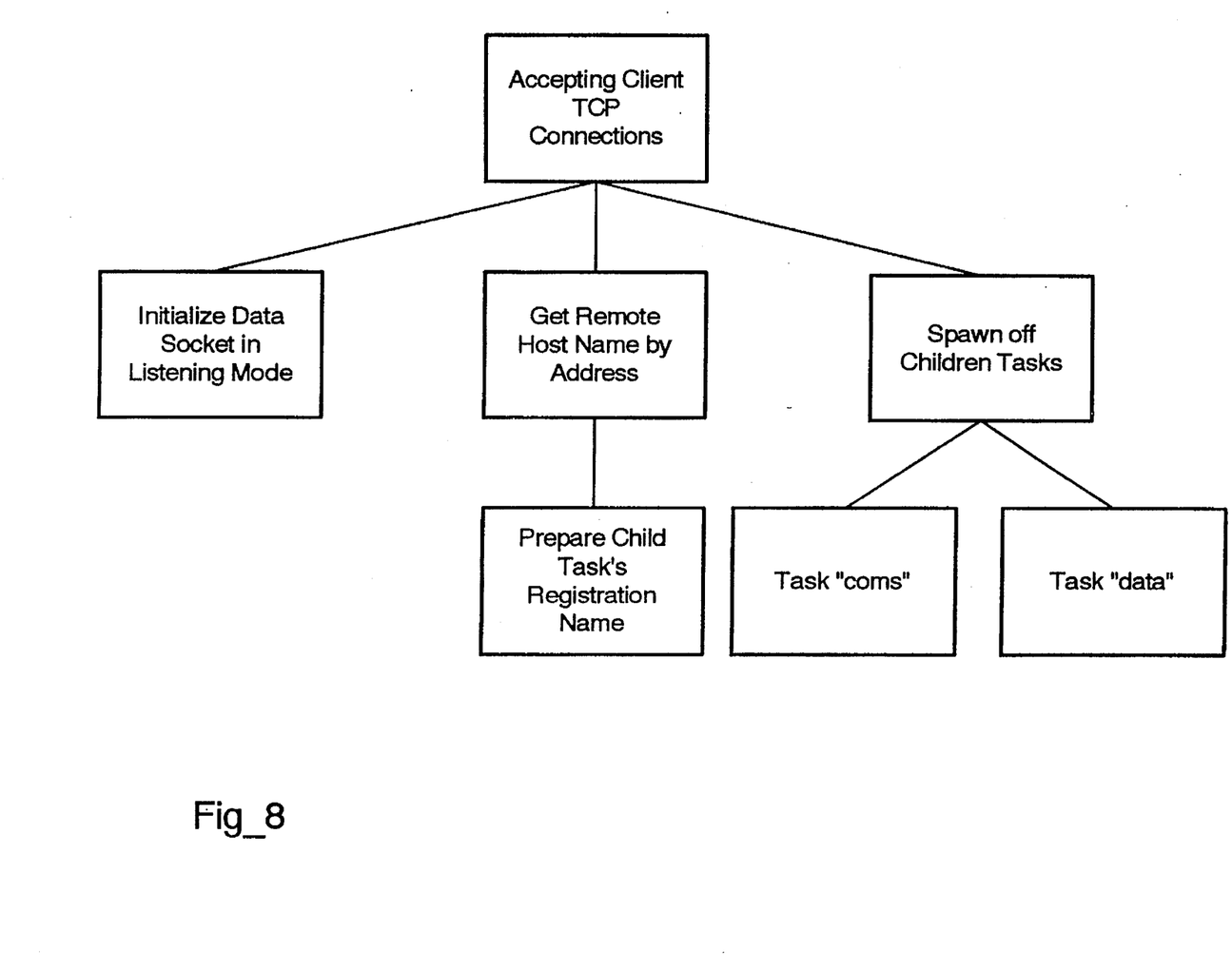
FIG. 8 is a structure diagram depicting the main program structure for the Gateway Service.

FIG. 8 illustrates the program structure diagram for the Main Program that first sets up the socket in "listening mode" for client connection request. Once the task gets into the do-forever-loop to accept () for more connections, each connection that comes in will result in a different socket id and child task extension number. These two parameters are then used for spawning off a set of child tasks: "coms" and "data" to service a particular session. Since multiple sessions can be opened in the Gateway, several copies of "coms" or "data" might exist on the task table at the same time. Task-to-task communications must therefore be handled according to the task registration name not the task name.

Figure 9:
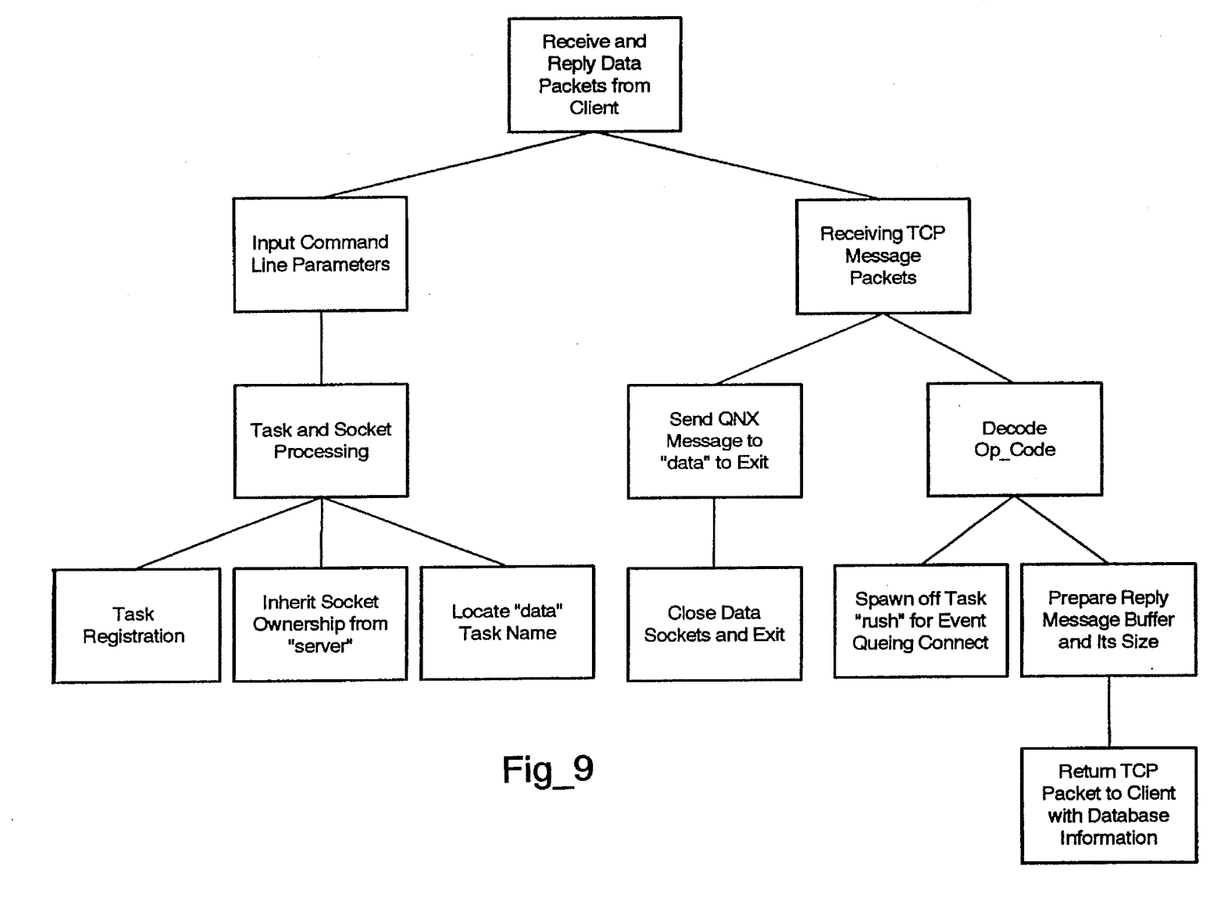
FIG. 9 is a structure diagram illustrating the Gateway Communication Task structure.

FIG. 9 shows the program structure diagram for the task "coms" designed as a separate task to process packets from the client and replies over the same open channel. The Register Task Name section consists of a QNX system call "name attach" to attach itself with the local clearinghouse so the "data" task can be communicated with. During the preparation stage, "coms" would also try to locate the corresponding "data" task name by calling "name-locate." Both the task name registration and location use the same command line parameters, consisting of socket id and child task number.

Receiving Packets are supposed to go on forever until the socket connection is disrupted, due to, for example, client application exiting, in which case the "coms" task must send a message to the "data" task to force it to exit before the task itself died. This provision is designed to avoid "zombie" processes remained in the system when a session is terminated.

After receiving a packet, the task "coms" first decodes the op-code to decide if it's "name locate," "send," or "vc-receive." The send message and reply packet sizes are different and must be specified accordingly. The program will then forward the message to the "data" task for processing, get the result back, and return it to the client application over the network.

Figure 10:
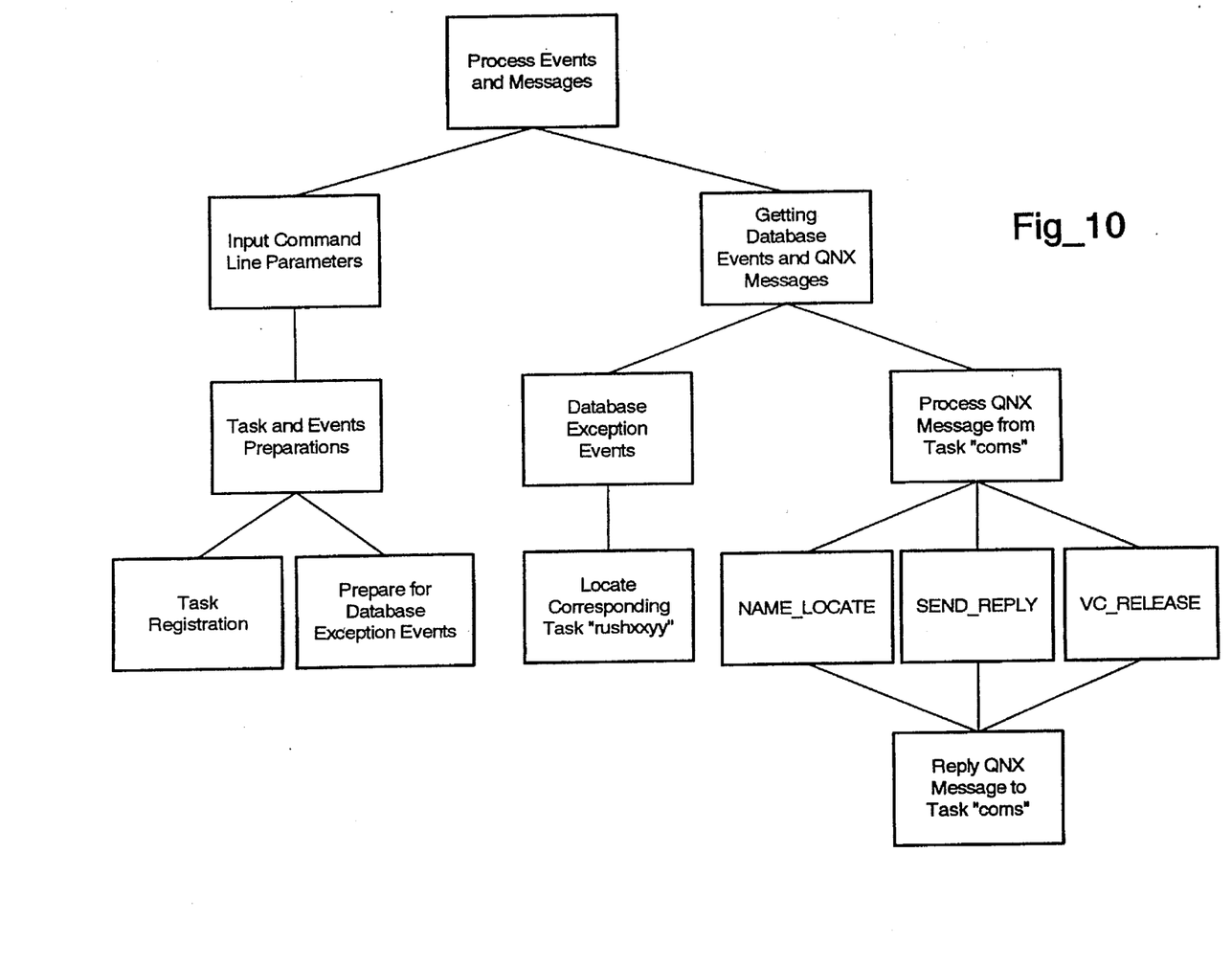
FIG. 10 is a structure diagram illustrating the Gateway Task Data structure.

FIG. 10 illustrates the program structure diagram for the task "data" to process either the messages from "coms" task or database (EDDB or CI) exceptions. After the Task registration and Event preparation (for setting up the exception handler), the Get Events routine is receive-blocked until either a Database Event comes in from the attached database item(s) or it gets a message from task "coms."

To process the Database Event, "data" will attempt to locate the task "rush" by name and send the exception to it. To process the message came in from "coms," it could be. "Data" will first decode the command message and then perform the QNX call accordingly. The result of this operation will be sent back to "coms" as a reply message to get it unblocked.

Figure 11:
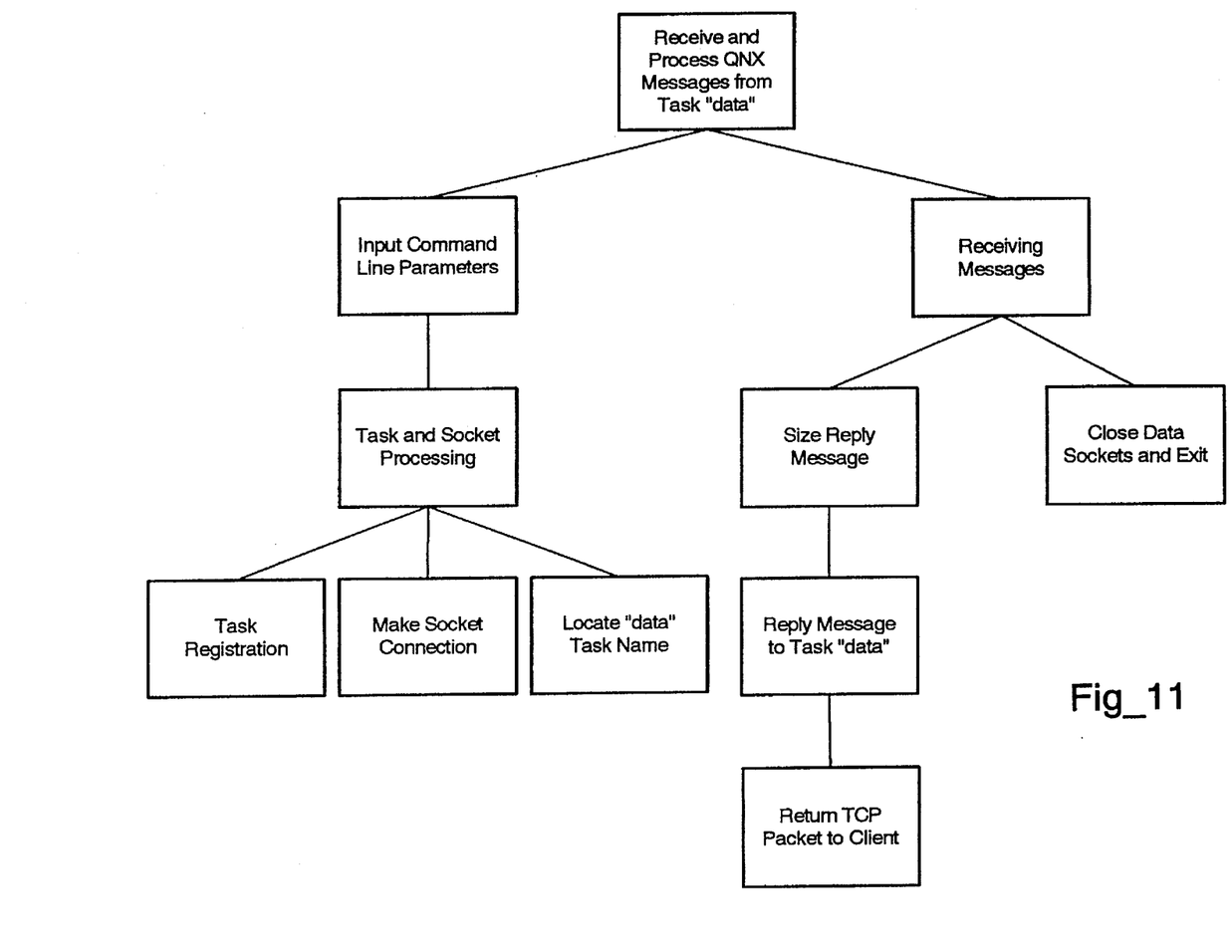
FIG. 11 is a structure diagram illustrating the Gateway Task Rush structure.

As soon as "coms" gets the reply message, it will generate a packet for returning to the client application. In the case of task "rush" (FIG. 11), its function is waiting to receive exception messages from "data," forward each message to client application over the event queing socket and reply to "data" to unblock the sender.

What is claimed is:

1. A glassware forming machine comprising an event driven database operating on a first platform, a workstation operating on a second platform and including application means for making and receiving API (Application Programming Interface) calls, an event driven database library, a gateway library and a BSD (Berkeley Software Distribution) socket library, said event driven database library bidirectionally interconnecting said application means and said gateway library and said gateway library bidirectionally interconnecting said event driven database library and said BSD socket library, and a network gateway operating on said first platform and including a BSD socket library and a gateway Service bidirectionally interconnecting said network gateway BSD socket library and said event driven database, and said BSD socket libraries communicating bidirectionally via TCP/IP (Transmission Control Protocol/Internet Protocol) packets, wherein said first platform is ONX, and wherein said second platform is either UNIX VAX/VMS or NOVELL NetWare.

* * * * *